United States Patent [19]
Schmidt

[11] 3,874,782
[45] Apr. 1, 1975

[54] LIGHT-GUIDING SWITCH, MODULATOR AND DEFLECTOR EMPLOYING ANTISOTROPIC SUBSTRATE

[75] Inventor: Ronald Vernon Schmidt, Matawan, N.J.

[73] Assignee: Bell Telephone Laboratories, Incorporated, Murray Hill, N.J.

[22] Filed: Oct. 1, 1973

[21] Appl. No.: 402,469

[52] U.S. Cl. .......................... 350/96 WG, 350/160 R
[51] Int. Cl. ............................................ G02b 5/14
[58] Field of Search ......... 350/96 WG, 96 C, 160 R

[56] References Cited
UNITED STATES PATENTS

| | | | |
|---|---|---|---|
| 3,655,261 | 4/1972 | Chang | 350/96 WG |
| 3,736,045 | 5/1973 | Heidrich et al. | 350/96 WG X |
| 3,802,760 | 4/1974 | Sosnowski | 350/96 WG |

OTHER PUBLICATIONS

Wang, et al., "Wave Propagation in Thin–Film Optical Waveguides Using Gyrotropic and Anisotropic Materials as substrates," *IEEE Journal of Quantum Electronics*, Vol. QE–8, No. 2, Feb. 1972, pp. 212-216.
Sosnowski "Polarization Mode Filters for Integrated Optics," *Optics Communications*, Vol. 4, No. 6, February/March 1972, pp. 408-412.

*Primary Examiner*—John K. Corbin
*Attorney, Agent, or Firm*—Wilford L. Wisner; E. W. Adams, Jr.

[57] ABSTRACT

There is disclosed a light beam switching, modulating and deflecting device which is comprised of a thin dielectric film or strip waveguide deposited on an anisotropic (i.e., uniaxial) crystalline substrate. The guide and substrate parameters are selected so that one polarization of an optical wave is supported as a guided mode in the guide and the other, orthogonal polarization is not supported. Applied electric field components or acoustic strain components interact with the substrate to cause a coupling of the guided wave from the supported polarization to the unsupported polarization. The wave, upon being coupled to the unsupported polarization, is automatically and immediately radiated out of a guided mode into a freely propagating substrate mode. The unique principle of operation of the device, involving a combination of polarization discrimination in the guide and polarization coupling through an electro-optic or acousto-optic modulation of the substrate, eliminates the need for phase-matching. Noncritical, spatially uniform electric field or acoustic strain components applied to the substrate can thus provide the desired effect. The structure and operation of the device are thus generally simpler than those of similar prior art alternatives.

10 Claims, 4 Drawing Figures

LIGHT-GUIDING SWITCH, MODULATOR AND DEFLECTOR EMPLOYING ANTISOTROPIC SUBSTRATE

BACKGROUND OF THE INVENTION

This invention relates to switches, modulators and deflectors for light guides and, more particularly, to light-guiding switches, modulators and deflectors employing anisotropic crystalline substrate materials.

Much of the current interest in the field of integrated optics for laser communication, data processing, and other such systems is centered around the problems of switching, modulating and deflecting light beams propagating in miniature thin-film or strip waveguides. The most common active guided wave device utilizes either the acousto-optic or the electro-optic effect to vary the propagation characteristics of a miniature waveguide, and thus to manipulate the wave propagating therein. Consider, for example, the acousto-optic deflector described in U.S. Pat. No. 3,655,261 issued on Apr. 11, 1972 to W. S. C. Chang. In the Chang device, acoustic surface waves propagating along a thin light-guiding film induce therein a spatially periodic refractive index variation which acts as a grating to diffract guided light energy out of the film into the substrate. The acousto-optic interaction in the film, in order to be efficient, requires phase-matching among the guided light wave, the scattered light wave and the acoustic surface waves. The phase-matching requirement, in turn, requires that the acoustic surface wave extend over many optical wavelengths in the film and that the acoustic wavelength be selected from a well-defined, but relatively narrow, range to provide the desired effect. Considerable restraints are thereby placed both on the fabrication and operation of the device.

A typical thin-film electro-optic modulating device is that described by J. N. Polky and J. H. Harris in Volume 21 of *Applied Physics Letters*, page 307 (1972). This device utilizes an interdigital electrode structure deposited on a major surface of a thin liquid electro-optic light-guiding film of nitrobenzene. A voltage applied across the interdigital electrodes induces a spatially periodic refractive index variation in the nitrobenzene film which, as in the Chang device, acts as a grating to diffract a portion of the light from the guide. To eliminate substantial portions of the light from the film, and thus to operate efficiently, the interdigital electrode structure must be provided with the proper interdigital spacing and overall length for the particular frequency of the light to be diffracted from the guide. Generally, small interdigital spacings are required, which result in relatively fine and delicate interdigital electrode structures.

While the foregoing devices are representative of the notable advances that have recently been made in the art toward the realization of a practical integrated optical switching and modulating device, they are nonetheless representative of the problems that remain to be solved. In proposed integrated optical systems, in which simplicity and ease of fabrication are paramount considerations, it is desirable to have a device which efficiently modulates light beams propagating in a thin-film or strip guide without the need for complicated, exact or delicate structures.

SUMMARY OF THE INVENTION

The present invention is directed toward simplifying the structure required to perform such operations as switching, modulating and deflecting light beams propagating as guided modes in thin-film or strip waveguides. It is broadly based upon the recognition of two basic principles: First, that a thin waveguiding body can be made to have a propagation characteristic, typically by choosing its thickness and refractive index in a proper relation to the refractive index of an anisotropic substrate upon which it is disposed, such that a first polarization of an optical wave propagates as a guided mode in the body and a second polarization of the wave is cut off therein as a freely propagating substrate mode; and, secondly, that the first polarization of the wave propagating in the body can be controllably coupled and converted to the second polarization freely propagating in the anisotropic substrate without phase-matching constraints by electro-optically or acousto-optically modulating the substrate. Thus, the desired propagation characteristic of the waveguiding body is first selected and fixed in a device embodied according to the invention and the desired switching effect is achieved through an appropriate interaction with the substrate.

In an illustrative embodiment of the invention, a light beam switching and modulating device is comprised of a thin dielectric film or strip waveguide deposited on a uniaxial crystalline substrate (i.e., a crystal having a single preferred or optic crystallographic axis and index of refraction that is different along different directions therein, ranging in value from $n_e$ measured along its optic axis to $n_o$ measured normal thereto). The thickness and refractive index of the guide and the orientation of the optic axis of the uniaxial substrate with respect to the guide are selected so that the guide supports as a guided mode only one polarization (e.g., the TE polarization) and not the other, orthogonal polarization (e.g., the TM polarization) of an optical wave. A simple electro-optic modulation of the substrate causes a coupling of the guided wave from the supported polarization (TE) to the unsupported polarization (TM). The result is that the coupled portion of the wave, because it is unsupported, is automatically and immediately radiated out of the guide into a freely propagating substrate mode.

As a result of this unique principle of operation, involving a combination polarization discrimination in the guide and polarization coupling through an electro-optic modulation of the substrate, the device of my invention does not require phase-matching to operate efficiently. Consequently, noncritical, spatially uniform electric field components in the substrate can be used to provide the desired modulation. Simple DC field-applying strip electrodes may thus be utilized, making the device of my invention generally simpler and less delicate in structure, as well as easier to fabricate, than many prior art alternatives.

A variable-angle acousto-optical guided wave deflector which makes use of this unique principle of operation is also described.

BRIEF DESCRIPTION OF THE DRAWING

A more complete understanding of the foregoing and other features and advantages of the invention can be obtained from the following detailed description taken in conjunction with the accompanying drawing in which.

DETAILED DESCRIPTION

The basic principles of the invention may best be illustrated by a detailed description of various specific embodiments thereof.

Figure 1:
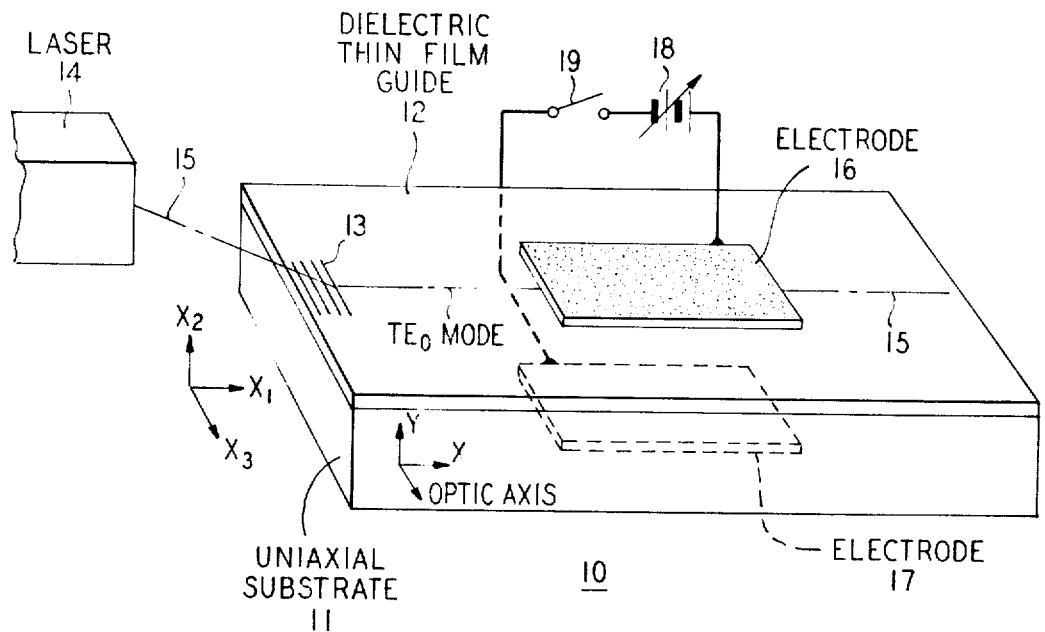
FIG. 1 is a partially pictorial, partially schematic illustration of an electro-optical switch and modulator embodied according to the invention.

FIG. 1 of the drawing illustrates an electro-optical embodiment of my invention. Device 10, which may serve as an optical switch and modulator for a thin-film dielectric waveguide system, is comprised of transparent uniaxial crystalline substrate 11, of a material such as lithium niobate ($LiNbO_3$), upon which is fabricated a transparent dielectric thin film guide 12, of a material such as zinc sulfide (ZnS) or tantalum pentoxide ($Ta_2O_5$). Guide 12 may be fabricated on substrate 11 by any of the well-known optical film forming techniques (e.g., evaporation or sputtering of the film material onto the substrate). It is illustratively a relatively wide (e.g., a few millimeters) thin film which confines beam 15 only within the $X_2$ direction shown in the illustrated coordinate system.

Grating coupler 13 is fabricated on the upper major surface of guide 12 to couple light beam 15 from a suitable source, such as laser 14, into guide 12 to propagate essentially parallel to the $X_1$ direction, as shown in FIG. 1. Such couplers, a description of which can be found in U.S. Pat. No. 3,674,335 issued to A. Ashkin, et al., on July 4, 1972, are now well known in the art.

Simple strip electrodes 16 and 17 are formed on the central area of the upper major surface of guide 12 and the lower major surface of substrate 11, respectively, with their longest dimension extending along the path of beam 15 in guide 12. The electrodes are illustratively made of a metal such as aluminum and may be deposited on the respective surfaces by any of the conventional techniques. Serially connected between these two electrodes are variable DC voltage source 18 and switch 19. Electrodes 16 and 17 are utilized to introduce a substantially spatially uniform electric field in substrate 11 which, as will be explained in more detail hereinbelow, provides the desired switching operation in device 10. Laser 14 is illustratively a helium-neon laser providing coherent light beam 15 of 0.6328 micrometers in wavelength. It is noted that the elements shown in FIG. 1 are not necessarily drawn to scale or to relative dimension.

As shown in FIG. 1, uniaxial crystalline substrate 11 illustratively has its X and Y crystallographic axes parallel to the $X_1$ and $X_2$ directions, respectively, and its Z or optic crystallographic axis parallel to the $X_3$ direction and thus parallel to the interface plane between guide 12 and substrate 11. At the 0.6328 micrometer wavelength, the refractive index of substrate 11, which is illustratively $LiNbO_3$, has a value $n_e$ measured parallel to the optic axis of 2.214 and a value $n_o$ measured normal to the optic axis of 2.294, where $n_e$ is referred to as the extraordinary index of refraction of substrate 11 and $n_o$ is the ordinary index of refraction of substrate 11. Since $n_o$ is greater than $n_e$, $LiNbO_3$ is said to be a negative uniaxial material. A positive uniaxial material would be one for which $n_e$ is greater than $n_o$.

The thickness (i.e., in the $X_2$ direction) and refractive index of guide 12 in device 10 are selected so that the guide supports as a guided wave only one polarization of beam 15 (i.e., either the TE polarization or the TM polarization). As an example, guide 12 is selected to guide the fundamental mode TE polarization wave (i.e., $TE_o$) of the coupled beam 15, but not the fundamental mode TM polarization wave (i.e., $TM_o$). As will be recognized by those skilled in the art, the TE (transverse electric) polarization waves of beam 15 are characterized by an electric light vector that is essentially parallel to the $X_3$ direction in guide 12, while the TM (transverse magnetic) polarization waves have a magnetic light vector essentially parallel to the $X_3$ direction and an electric light vector essentially parallel to the $X_2$ direction.

One way of providing the desired polarization discrimination in guide 12 of device 10 is to select the refractive index of the guide to exceed both the ordinary $n_o$ and the extraordinary $n_e$ indices of substrate 11 and to select the thickness of guide 12 so that only the $TE_o$ wave is supported as a guided mode. With the $LiNbO_3$ substrate, ZnS would be a suitable choice for the guide material, since it has a refractive index $n_g$ at 0.6328 micrometers equal to 2.340, which exceeds both the $n_e$ and $n_o$ of $LiNbO_3$. It is well known that, for a configuration of the type illustrated in FIG. 1, the $TM_o$ wave requires a greater guide thickness to propagate than the corresponding $TE_o$ wave. There exists a range of guide thicknesses from which the thickness of guide 12 can be selected to cut off propagation of the $TM_o$ wave. For the embodiment just described, in which guide 12 is formed of ZnS, this range is approximately 0.16 micrometers to 0.33 micrometers. Thus, the thickness of the ZnS guide 12 in FIG. 1 is illustratively selected to be about 0.20 micrometers and the guide supports only the $TE_o$ wave of beam 15.

An alternative way of providing the polarization discrimination in the guide 12 is to provide the guide with a refractive index that is bracketed in value by the ordinary and extraordinary indices of uniaxial substrate 11. See, for example, Volume 4 of *Optics Communications*, pages 408 through 412 (1972). Such a case can be illustratively realized with amorphous tantalum pentoxide, $Ta_2O_5$, as the guide material $Ta_2O_5$ having an index $n_g$ at 0.6328 micrometers of 2.22, which falls between $n_e$ and $n_o$ of the $LiNbO_3$ substrate. In this case, the $TE_o$ wave in guide 12 will always have its electric light vector parallel to the optic axis of substrate 11 and thus will be influenced only by the extraordinary refractive index $n_e$ thereof. The $TM_o$ wave, on the other hand, will have an electric light vector component normal to the optic axis, and thus will be influenced by the ordinary index $n_o$ of the substrate. Since $n_o > n_g > n_e$, the $TE_o$ will "see" a lower index in substrate 11, while the $TM_o$ wave will see a higher index in the substrate. The $TE_o$ wave will thus propagate as a guided mode in guide 12, while the $TM_o$ wave will radiate as a freely propagating substrate mode into substrate 11.

Accordingly, as a result of the proper choice of thickness and refractive index of guide 12, and of the orientation of the optic axis of uniaxial substrate 11 with respect to the guide-substrate interface plane, beam 15 illustratively propagates through guide 12 as a $TE_o$ wave. Any attempt to excite the $TM_o$ wave of beam 15 in guide 12 will cause the beam to leak from the guide into substrate 11.

To provide the desired light beam switching or modulating effect in device 10, it is necessary simply to to convert the guided $TE_o$ wave to the unguided and unsupported $TM_o$ wave. This conversion is accomplished according to my invention by utilizing strip electrodes 16 and 17 to modulate the region of substrate 11 adjacent to guide 12 in a manner to couple the electric light vectors of beam 15 parallel to the $X_3$ direction in the guide (i.e., the $TE_o$ wave) to electric light vectors in the plane perpendicular to the $X_3$ direction (i.e., the $TM_o$ wave). To understand how the desired electric light vector coupling is accomplished according to my invention requires a basic understanding of the physical and optical properties of anisotropic crystals. Those skilled in the crystal optics art will generally have such an understanding. For a review of the basic terminology, reference is made to a book entitled *Physical Properties of Crystals*, by J. F. Nye, Oxford University Press (1957), particularly pages 235 through 315 thereof.

In the contracted tensor notation of the above-cited text, the unperturbed dielectric constant $\bar{\epsilon}$ of a crystalline substrate, such as substrate 11 of device 10, may generally be represented by a tensor of the form $$\bar{\epsilon} = \begin{pmatrix} \epsilon_1 & & \\ & \epsilon_2 & 0 \\ 0 & & \epsilon_3 \end{pmatrix} \quad (1)$$

where $\epsilon_1$, $\epsilon_2$ and $\epsilon_3$ are the principal dielectric permittivities of the substrate measured along the principal directions $X_1$, $X_2$ and $X_3$, respectively. Isotropic crystals are those in which $\epsilon_1 = \epsilon_2 = \epsilon_3$. Anisotropic crystals have at least two principal permittivities that are unequal and include uniaxial crystals and biaxial crystals. In uniaxial crystals, in which the $X_3$ direction is defined as collinear with the optic axis, $\epsilon_1 = \epsilon_2 \neq \epsilon_3$. Biaxial crystals, as the name implies, have two optic axes, and $\epsilon_1 \neq \epsilon_2 \neq \epsilon_3$.

When an electric field or an acoustic strain is applied to the substrate, the dielectric tensor $\bar{\epsilon}$ is modulated according to the form $$\bar{\epsilon}' = \begin{pmatrix} \epsilon_1 + \Delta\epsilon_1 & \Delta\epsilon_6 & \Delta\epsilon_5 \\ \Delta\epsilon_6 & \epsilon_2 + \Delta\epsilon_2 & \Delta\epsilon_4 \\ \Delta\epsilon_5 & \Delta\epsilon_4 & \epsilon_3 + \Delta\epsilon_3 \end{pmatrix} \quad (2)$$

Thus, it can be seen that, in general, nonzero, off-diagonal terms are introduced into the substrate's dielectric tensor, the magnitude of which terms are directly proportional to the magnitudes of the applied electric field and/or acoustic strain components along the principal directions in the substrate. These off-diagonal nonzero terms have an important effect on optical waves propagating in a guide formed on a surface of the substrate. They give rise to an exchange of energy, or coupling, between waves with electric light vectors parallel to one of the principal directions and waves with electric light vectors parallel to another of the principal directions. Specifically, it can be shown that nonzero off-diagonal terms of the form $\Delta\epsilon_4$ of Equation (2) cause electric light vectors parallel to the $X_3$ direction to couple to electric light vectors parallel to the $X_2$ direction, and vice versa. Similarly, the terms $\Delta\epsilon_5$ and $\Delta\epsilon_6$ of Equation (2) cause electric light vector coupling between the $X_3$ and the $X_1$ directions, and between the $X_1$ and the $X_2$ directions, respectively.

The desired nonzero off-diagonal permittivities shown in Equation (2) can be controllably generated in a selected crystal either electro-optically or acousto-optically. In general, an electric field component $E_k$ in the crystal parallel to the $X_k$ direction, where $k = 1$ through 3, will produce permittivities $\Delta\epsilon_j$ according to the relation $$\Delta\epsilon_j = -\epsilon_j^2 \sum_k r_{jk} E_k \quad (4)$$

where $j = 1$ through 6, $r_{jk}$ are the electro-optic coefficients of the crystal and $\epsilon_5^2 = \epsilon_1\epsilon_3$, $\epsilon_6^2 = \epsilon_1\epsilon_2$ and $\epsilon_4^2 = \epsilon_2\epsilon_3$.

Similarly, an acoustic wave propagating in a uniaxial crystal will produce therein strain components $S_i$, where $i = 1$ through 6. These strain components generate permittivities $\Delta\epsilon_j$ through the photoelastic effect in the crystal according to the relation $$\Delta\epsilon_j = -\epsilon_j^2 \sum_i P_{ji} S_i \quad (5)$$

where $J = 1$ through 6, $P_{ji}$ are the photoelastic coefficients of the crystal, and again $\epsilon_5^2 = \epsilon_1\epsilon_3$, $\epsilon_6^2 = \epsilon_1\epsilon_2$ and $\epsilon_4^2 = \epsilon_2\epsilon_3$.

The photoelastic coefficients $P_{ji}$ and the electro-optic coefficients $r_{jk}$ may be zero or nonzero in any particular crystallographic direction for any particular crystal and vary in overall form depending primarily upon the type and class or crystalline system involved. Appendix E of the above-referenced book by Nye sets forth the form of these coefficients, in tensor notation, for each type and class of anisotropic crystal of interest. It will be noted that $LiNbO_3$ is a uniaxial crystal of the trigonal system, class 3M.

It can thus be seen that, to provide the desired switching effect in device 10 of the drawing, that is, to couple electric light vectors parallel to the $X_3$ direction to electric light vectors parallel to the $X_2$ direction in guide 12 device 10, nonzero off-diagonal terms of the form $\Delta\epsilon_4$ must be introduced into the dielectric constant of uniaxial $LiNbO_3$ substrate 11.

By closing switch 19, a voltage applied across electrodes 16 and 17 will produce an electric field component $E_2$ in substrate 11 along the Y crystallographic direction. The $E_2$ field component, through the electro-optic coefficient $r_{42}$, introduces the desired nonzero off-diagonal term in the dielectric tensor $\bar{\epsilon}$ (i.e., $\Delta\epsilon_4$). With the application of the voltage to electrodes 16 and 17, electric light vectors parallel to the $X_3$ direction are thus coupled to electric light vectors parallel to the $X_2$ direction and at least a portion of guided beam 15 is converted from the $TE_o$ polarization to the $TM_o$ polarization. The converted portion of the beam, because it is unsupported in guide 12, is automatically and immediately radiated out of the guide into a freely propagating beam in substrate 11. Substantially complete conversion of the guided beam to the unsupported polarization, and thus substantially complete elimination of the beam from the guide, can be realized by making electrodes 16 and 17 of sufficient overall length in the direction of the beam propagation. For example, in the illustrative embodiment of FIG. 1, in which guide 12 is formed of ZnS and substrate 11 illustratively has a thickness of about 10 micrometers, calculations show that an applied voltage of about 30 volts and an overall electrode length of about one centimeter would be required to provide nearly complete elimination of beam 15 from guide 12. Amplitude modulation of beam 15 in guide 12 can then be achieved by operation of the device with voltages varying in magnitude within the limits of 0 and 30 volts.

Because of the unique principle of operation of device 10, involving a combination polarization discrimination in guide 12 and polarization coupling through the linear electro-optic effect in uniaxial substrate 11, device 10 does not require phase-matching to operate efficiently. Once the desired propagation characteristic of guide 12 is selected and fixed in the device, a spatially uniform electric field component $E_2$ along the $X_2$ direction over a sufficient length of the guide is thus sufficient to block transmission of the guided beam. Precise phase-matching arrangements are not required, since the beam is eliminated from the guide automatically and immediately upon being converted to the unsupported polarization.

It may be appreciated that the voltage requirements of device 10 can be minimized by making the thickness of substrate 11 as small as possible in any given embodiment. Thicknesses for substrate 11 of about a few micrometers are preferred. Device 10 of FIG. 1 would typically be deposited on a substantially thick support (not shown), such as a standard microscope glass slide, to provide sufficient structural rigidity.

Figure 2:
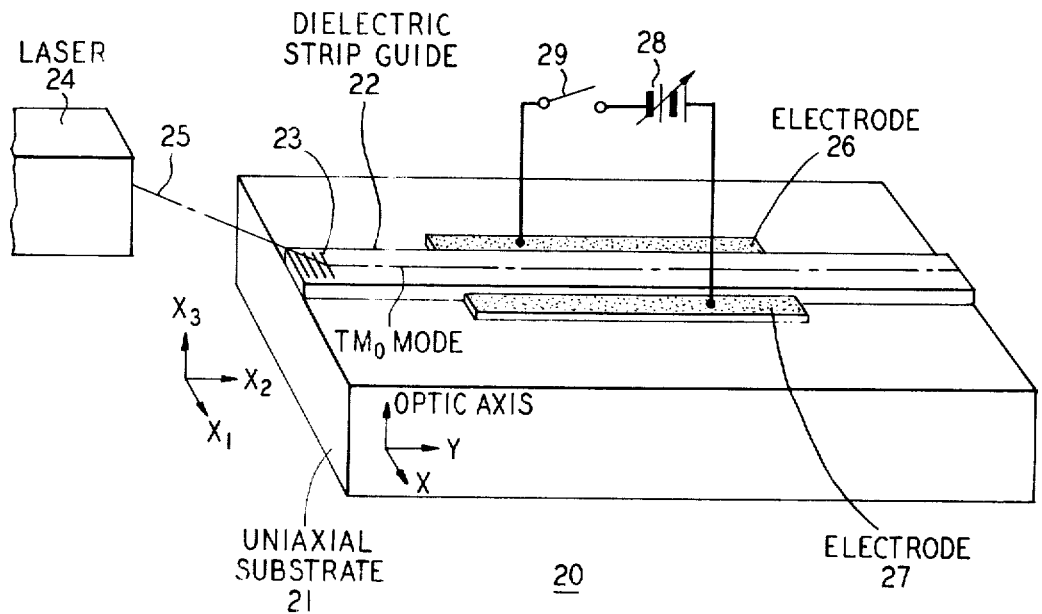
FIG. 2 is a partially pictorial, partially schematic illustration of a modified version of the electro-optical switch and modulator shown in FIG. 1.

FIG. 2 of the drawing shows a second illustrative embodiment of my invention which utilizes the electro-optic properties of a suitable uniaxial substrate to provide the desired light beam switching and modulating effect.

In device 20 of FIG. 2, thin dielectric strip guide 22 is formed on the upper major surface of uniaxial crystalline substrate 21. Guide 22, unlike thin film guide 12 of FIG. 1, illustratively has a width (i.e., in the $X_1$ direction as shown in FIG. 2) of about 3 micrometers, so as to confine beam 25 from laser 24 within both the $X_3$ and $X_1$ directions. As will be discussed in more detail hereinbelow, there are advantages in using a guide in device 20 which confines the beam within two dimensions. Also formed on the upper surface of substrate 21 on opposite sides of guide 22 are strip electrodes 26 and 27 with their longest dimensions extended along the path of beam 25 in guide 22. The remaining illustrative structural details of device 20 are identical to those specified hereinabove with respect to device 10 of FIG. 1, except as otherwise specifically noted below. It will be noted that the respective elements of device 20 are referenced by numerals 10 units higher than their corresponding elements in device 10 of FIG. 1.

In contrast to device 10, uniaxial substrate 21 of device 20 illustratively has its optic crystallographic axis oriented normal to the interface plane between guide 22 and substrate 21. The $X_1$, $X_2$ and $X_3$ axes of the illustrated coordinate system are again parallel to the X, Y and optic crystallographic axes, respectively, of substrate 21.

The desired polarization discrimination can be achieved in guide 22 in essentially the same manner that it was achieved in device 10 above. It will be noted, however, that, as a result of the different orientation of the optic axis of substrate 21 in device 20, the $TM_o$ polarization wave becomes the supported wave in guide 22, while the $TE_o$ polarization wave is unsupported. Consider, for example, the configuration of FIG. 2 in which substrate 21 is formed of crystalline $LiNbO_3$ and guide 22 is formed of ZnS. As noted previously, the ZnS has an index of refraction which exceeds both the ordinary and extraordinary indices of $LiNbO_3$. In such a configuration, the $TE_o$ wave of beam 25 requires a greater guide thickness to propagate in guide 22 than does the $TM_o$ wave. Specifically, by selecting the thickness of guide 22 within the range of about 0.20 micrometers to about 0.29 micrometers, propagation in guide 22 in the $TM_o$ wave is possible, while the $TE_o$ wave is cut off therein.

To provide the desired switching and modulating effect in device 20, one couples the electric light vectors of beam 25 that are parallel to the $X_3$ direction (i.e., the $TM_o$ wave) to electric light vectors that are parallel to the $X_1$ direction (i.e., the unsupported $TE_o$ wave). This coupling is accomplished in device 20 by applying a voltage between strip electrodes 26 and 27 to create in substrate 21 an electric field component $E_1$ along the $X_1$ direction. This electric field component, through the electro-optic coefficients $r_{51}$ and $r_{61}$ in substrate 21, creates nonzero off-diagonal permittivities in the dielectric tensor $\bar{\epsilon}$ of the form $\Delta\epsilon_5$. These nonzero terms give rise to the desired electric light vector coupling, again without the requirement of phase-matching or a complicated and exact field-applying electrode structure in device 20. With a spacing between electrodes 26 and 27 of about 3.0 micrometers, and with an applied voltage of about 10 volts, calculations show that electrodes of about 1 cm in length will cause nearly complete conversion of the guided beam 25 and thus nearly complete elimination of the light from guide 22. Amplitude modulation of beam 25 is achieved simply by varying the applied voltage.

The advantages resulting from the use of a strip guide 22 in device 20 rather than a thin-film guide with an arbitrarily large transverse dimension should now be apparent. First, the strip guide inhibits natural spreading of the guided beam in the $X_1$ direction and thus confines the beam to a well-defined region in the device. Additionally, the strip guide allows electrodes 26 and 27 to be spaced relatively closely together. The amount of voltage that must be applied across the electrodes to produce an electric field component in substrate 21 of a particular magnitude is thus reduced. This leads to improvements in the operating voltage requirements of the device.

Figure 3A:
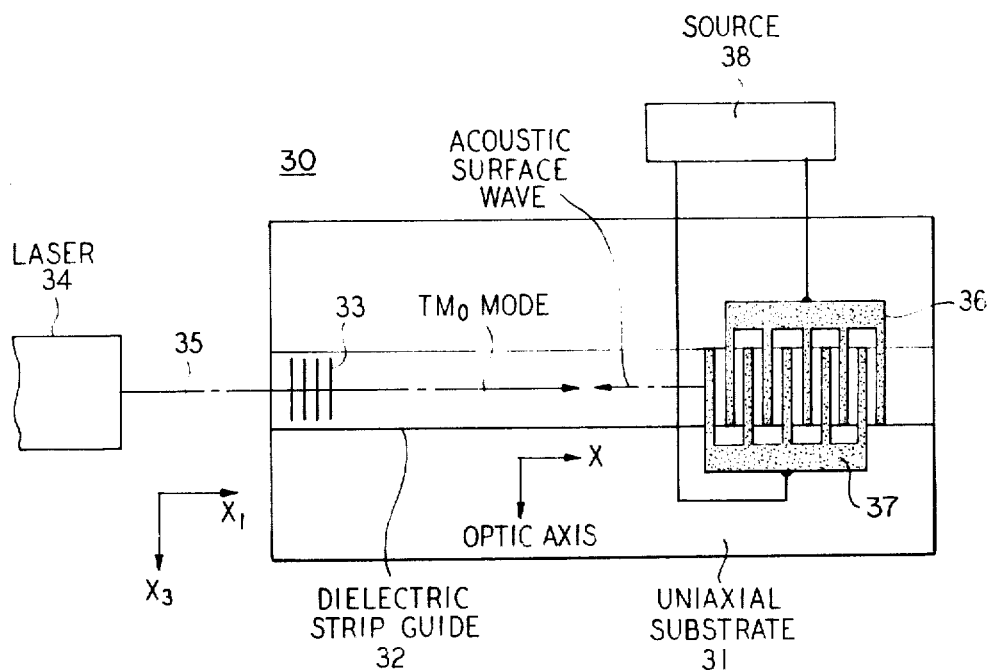
FIGS. 3A and 3B are top and side plane views, respectively, of an acousto-optical deflector embodied according to the invention.
Figure 3B:
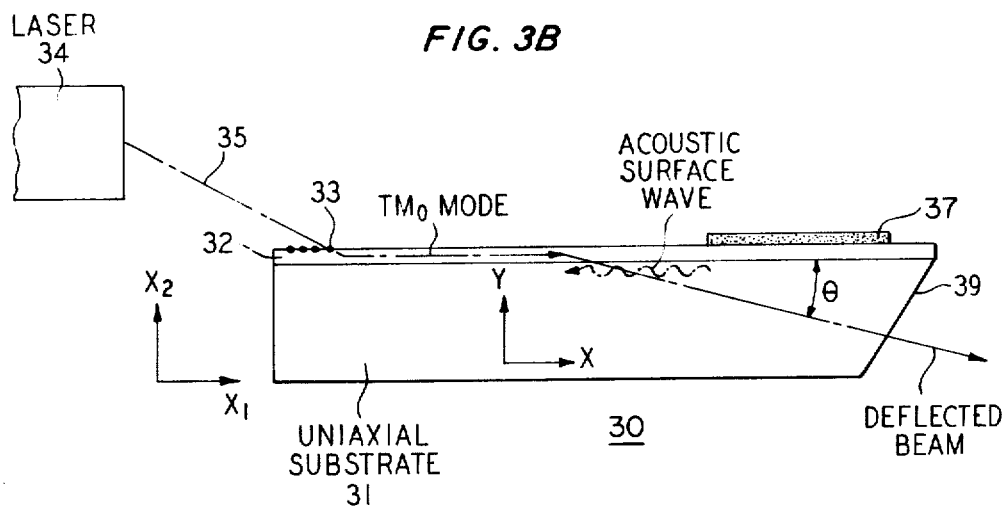

The basic principles outlined illustratively hereinabove with respect to the embodiments of FIGS. 1 and 2 can also be employed in the design of acousto-optic guided wave devices which perform important functions for integrated optics arrangements. For example, consider the acousto-optic deflector 30 illustrated in planar view in FIGS. 3A and 3B of the drawing. It will be noted that FIGS. 3A and 3B are orthogonal views of the same device. Deflector 30 comprises uniaxial substrate 31, which is illustratively crystalline quartz, upon which is formed a thin strip guide 32. In contrast to LiNbO$_3$, which is a negative uniaxial material, quartz is a positive uniaxial material and its extraordinary index of refraction (1.552) exceeds its ordinary index $n_o$ (1.543). As indicated by the above-cited Nye reference, quartz is also a trigonal system uniaxial crystal, but of class 32. Source 34 is again illustratively a He—Ne laser providing beam 35 of 0.6328 micrometers.

As in the other embodiments of my invention, the thickness and refractive index of guide 32 and the orientation of the optic axis of quartz substrate 31 are selected so that guide 32 supports as a guided wave one polarization of beam 35, but not the other, orthogonal polarization thereof. For example, in the illustrative embodiment of FIGS. 3A and 3B, the optic axis of quartz substrate 31 is oriented parallel to the guide-substrate interface plane (i.e., parallel to the X$_3$ direction) and guide 32 is formed of a sputtered glass film which is a mixture of Corning 7059 glass and fused silica having an index of refraction $n_g$ at 0.6328 micrometers of 1.555, which exceeds both the $n_e$ and the $n_o$ of quartz substrate 31. By choosing the thickness of guide 32 (i.e., in the X$_2$ direction) to be about 1.0 micrometer, it supports only the TM$_0$ polarization and not the TE$_0$ polarization of beam 35.

Interdigital acoustic surface wave transducers 36 and 37 are formed over guide 32 and connected to a variable frequency electrical source 38 to provide an acoustical surface wave propagating antiparallel to the direction of propagation of beam 35 in substrate 31. The acoustic surface wave propagating in the −X$_1$ direction in guide 32 and substrate 31 will produce acoustic strain components S$_1$, S$_2$ and S$_6$ in the region of substrate 31 adjacent to guide 32. As noted generally above, these strain components, through the photoelastic coefficients P$_{11}$, P$_{12}$ and P$_{56}$, will give rise to nonzero off-diagonal permittivities in the dielectric tensor $\bar{\epsilon}$ of the form $\Delta\epsilon_1$ and $\Delta\epsilon_5$. The propagating TM$_0$ polarization of beam 35 is thus coupled to the TE$_0$ polarization (through electric light vector coupling) and the converted portion of the wave is radiated out of guide 32 into a freely propagating wave in substrate 31. The angle $\theta$ at which beam 35 leaves guide 32 is dependent upon the acoustic surface wavelength. It is accordingly possible, by varying the frequency of the signal applied to transducers 36 and 37 from source 38, and thus by varying the wavelength of the acoustic surface wave, to vary the deflection angle $\theta$. If desired, deflected beam 35 can then be extracted from substrate 31 for utilization. The end surface 39 of surface 31 is thus illustratively cut at Brewster's angle to avoid reflection losses at the surface.

While deflector 30 of FIGS. 3A and 3B of the drawing may appear structurally similar to the acousto-optical deflector disclosed in the above-cited Chang patent, its differences in structure and principle of operation are significant. Like device 10 and device 20 above, the operation of device 30 is based upon the ability of guide 32 to discriminate differing polarizations of guided beam 35 and upon the ability of uniaxial substrate 31 to give rise to polarization wave coupling in guide 32. As a result of this unique operation, deflector 30 does not possess both an upper and lower limit on the permissible acoustic wavelength, but will operate efficiently in the region of arbitrarily long acoustic wavelengths. Thus, even infinitely long wavelengths, i.e., DC acoustic strain components, will provide the desired effect in deflector 30. Interdigital acoustic surface wave transducers 36 and 37 can, as a result be relatively coarse and uncritical structures. The Chang deflector, on the other hand, because its operation is based upon the diffraction of guided light from an acoustic surface grating induced in the thin film, requires that the acoustic surface wavelength be selected from a relatively narrow range in practical terms for the light to be efficiently deflected out of the thin film into the substrate. Deflector 30 of the present invention would thus appear to be preferable for many applications because of the reduced restraints.

An additional feature of deflector 30 is that, because of the relatively small width (i.e., in the X$_3$ direction) of guide 32, it acts as an acoustic surface waveguide in confining and concentrating the acoustic power to a relatively small area of the device. Efficient operation of the device, with low input power, is thus possible.

Various modifications of the above-described embodiments will now be apparent to those skilled in the art without departing from the scope of the invention, as defined by the appended claims. For example, as previously noted, it should now be clear that the various features and advantages of the invention can be realized utilizing as the substrate in the devices any of a wide variety of anisotropic crystalline materials, including uniaxial as well as biaxial crystals. In addition to the materials already disclosed, lithium tantalate (LiTaO$_3$), tellurium dioxide (TeO$_2$) and lead molybdate (PbMoO$_2$) are useful materials for the anisotropic substrate. The anisotropic material may be either a positive or negative material and the selected optic axis thereof may be oriented parallel to or normal to the guide-substrate interface plane. The optimum anisotropic crystal and crystal orientation should be determined in each case to yield a large electro-optic or photo-elastic coefficient for the desired polarization in the guide. Moreover, a variety of optically transparent materials may be used for the guide in the above-described embodiments. Other suitable guide materials include polymeric compounds such as polyurethane or poly(methyl methacrylate), semiconductor compounds such as ZnO, TiO$_2$, etc. and any of a variety of optical glasses. Various combinations of guide and substrate parameters will be realized which provide the desired operation described illustratively hereinabove.

I claim:

1. An optical device of the type comprising a transparent substrate having first and second substantially flat, opposing major surfaces, a body of transparent material disposed on the first major surface of said substrate having a thickness so as to be capable of guiding a wave of optical electromagnetic radiation within that dimension, and means for launching a wave of optical electromagnetic radiation into a guided mode in said body to propagate substantially parallel to the first major surface of said substrate, said device being characterized in that said substrate is formed of an anisotropic crystalline material having an optic axis, a first index of refraction for a wave with electric vector polarized parallel to the optic axis and a second index of refraction for a wave with electric vector polarized normal to the optic axis, the thickness and refractive index of said waveguiding body and the orientation of the optic axis of said substrate with respect to the first major surface being selected so that said body supports as a guided wave one polarization of said wave but not the other, orthogonal polarization of said wave, said device being further characterized by means for interacting with said anisotropic substrate to couple at least a portion of said guided wave from the supported polarization to the unsupported polarization in said waveguiding body, said coupled portion of said wave propagating immediately out of said body into said substrate.

2. The device of claim 1 in which said anisotropic substrate is a uniaxial crystal having a single optic axis oriented parallel to the first major surface of said substrate.

3. The device of claim 1 in which said anisotropic substrate is a uniaxial crystal having a single optic axis oriented normal to the first major surface of said substrate.

4. The device of claim 2 in which said anisotropic substrate consists essentially of lithium niobate (LiNbO$_3$).

5. The device of claim 3 in which said anisotropic substrate consists essentially of quartz.

6. The device of claim 1 in which the refractive index of said waveguiding body exceeds both the first refractive index and the second refractive index of said substrate and the thickness of said waveguiding body is sufficiently thin so that said body supports as a guided wave one polarization but not the other, orthogonal polarization of said wave.

7. The device of claim 1 in which the refractive index of said waveguiding body has a value between the first refractive index of said substrate and the second refractive index of said substrate.

8. The device of claim 1 in which said waveguiding body is a film disposed on substantially the entire area of the first major surface of said substrate and in which said substrate interacting means comprises a pair of elongated strip electrodes, one of which is formed on said film, the other of which is formed on the second major surface of said substrate, said electrodes having their longest dimension essentially parallel to the direction of propagation of the guided wave in said film, and a source means for applying a voltage between said electrodes to introduce a spatially uniform electric field component in said substrate which causes the coupling of the guided wave from the supported polarization to the unsupported polarization.

9. The device of claim 1 in which said waveguiding body is a strip having a width of the order of its thickness, said strip being disposed on the first major surface of said substrate and in which said substrate interacting means comprises a pair of elongated strip electrodes disposed on the first major surface of said substrate on opposite sides of said strip, and a source means for applying a voltage between said electrodes to introduce a spatially uniform electric field component in said substrate which causes the coupling of the guided wave from the supported polarization to the unsupported polarization.

10. The device of claim 1 in which said substrate interacting means comprises means for launching an acoustic surface wave propagating in said substrate essentially antiparallel to the direction of propagation of the guided wave in said waveguiding body to introduce in said substrate acoustic strain components which cause the polarization coupling of the guided wave, said acoustic wave launching means providing an acoustic surface wave of variable wavelength, the coupled portion of said wave propagating out of said body into said substrate at an angle with respect to the first major surface substantially directly related to the acoustic surface wave wavelength.

* * * * *